United States Patent Office 2,805,819
Patented Sept. 10, 1957

2,805,819

TURBINE DRIVEN BLOWERS OR PUMPS

Alfred Buchi, Sr., Hurden, and Alfred Buchi, Jr., Winterthur, Switzerland

Application May 23, 1955, Serial No. 510,232

Claims priority, application Switzerland June 3, 1954

9 Claims. (Cl. 230—116)

The invention relates to turbine driven blowers or pumps, e. g. for charging internal combustion engines and the like, with the turbine rotor mounted in an overhung position, especially for a bearing shaft directed vertically upwards and one whose fixed bearing projects at least partially into the hub part of the turbine rotor. It may consist in the fact that in the central part of the housing, from out of which the bearing projects into the blower rotor hub, there is an oil collecting duct, situated around the bearing shaft at a distance therefrom, which duct collects the oil emerging from the lubricating oil ducts of the bearing points.

The purpose of the invention is, in a design of a turbine blower pump with a bearing shaft directed upwards and the turbine rotor mounted at the lower end thereof, to collect the lubricating oil emerging from the bearing points at a point from which it may flow to the outside by gravity. However the oil run-off and air vent ducts may be so arranged that they can also be used for a design with horizontal or sloping shaft or one pointing vertically downwards from the turbine rotor, i. e. in any case the structural parts are designed substantially alike or similar forms can be used for the parts.

From the oil collecting duct run-off pipes sloping downwards with respect to the horizontal can be provided, in such a way that in the case of a bearing shaft pointing upwards the oil runs off by gravity to the outside. The pipes or ducts leading to the outside may empty into a space, e. g. an annular space, which is disposed alongside the pressure accumulator housing of the blower on the inner side of same, from which pipes lead to the outside. In the case of a horizontal bearing shaft, air vent ducts may issue from the top of this space. At least one axially directed duct may issue from the oil collecting duct. In the case of a bearing shaft pointing vertically upwards from the turbine below, this duct can be used as an air vent duct, while in the case of a horizontal shaft, or one pointing downwards from above, hence with the blower housing below the turbine housing, these axially directed ducts can be used for conducting away the lubricating oil emerging from the bearing points.

The machine motor hub with its extension up to the oil overflow may be bored out as far as the latter, entirely cylindrically or with diameter increasing constantly or by stages up to the oil overflow in such a way that lubricating and cooling air flowing down into it is driven by the increasing centrifugal force upwards and to the overflow point, without requiring the exertion of any pressure from the bearing points themselves.

The design of the clearance space can be so chosen and the oil feed ducts and oil pressure so adjusted, that during operation the clearance space never becomes wholly filled with oil running down. In this way friction of the ascending oil cylinder on the fixed part of the bearing is avoided. Hence, smaller friction forces of the oil at the fixed bearing part are experienced, as well, and the oil run-off is facilitated, especially as air can enter through the slot which forms inside.

In such an arrangement a labyrinth seal can advantageously be provided for the oil in the collecting duct at the outside of the blower hub opposite the fixed part of the bearing. The labyrinth seal can be blocked, e. g. by means of a hole or duct leading from the pressure space, by barrage air to prevent oil from getting into the blower. The blower hub around the fixed bearing can extend as far as the entrance into the oil collecting duct. The oil collecting duct can be placed so that the pipes leading away from it, which are at least partially sloped away from the horizontal, pass through either above or below the pressure duct of the pressure medium for the blower or pump.

In a design with several pipes leading away above the pressure space of the blower or pump, the oil collecting duct can be moved outwards in axial direction, in the central part of the housing, far enough so that in the case of a vertical bearing shaft the necessary gradient for the escape of the oil is assured.

Figure 1:
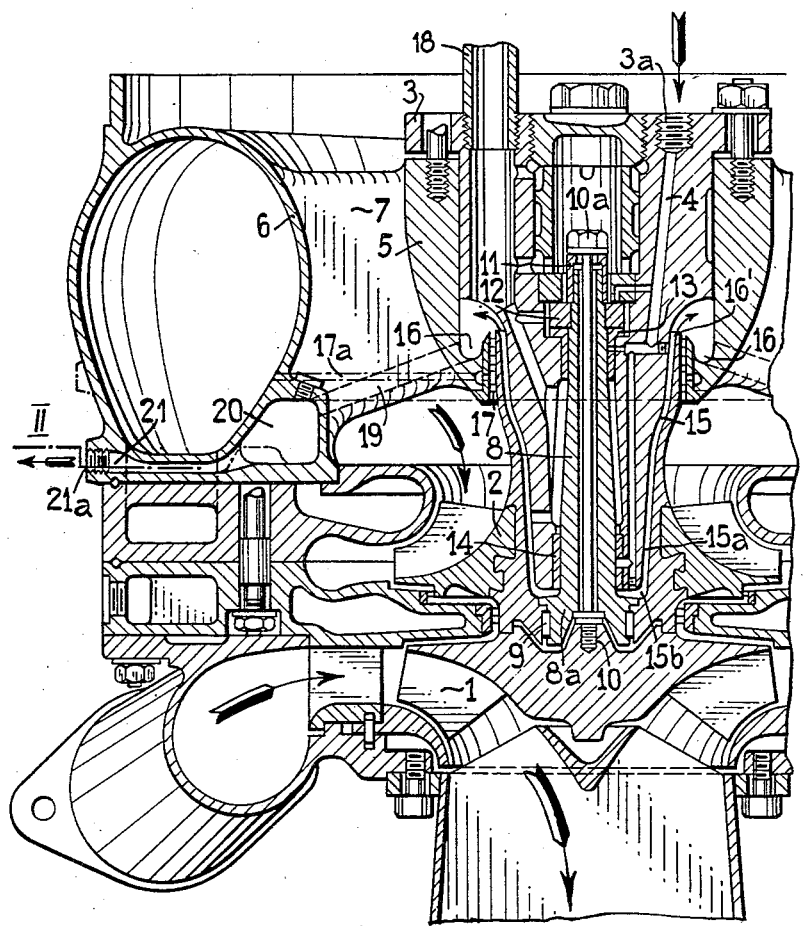
Figure 1 shows an axial section through both rotors which are mounted in overhung arrangement by means of a bearing shaft running from bottom to top. The section corresponds to the line I—I of Fig. 2.

In Fig. 1, the No. 1 denotes the turbine rotor, 2 the blower rotor, 3 the fixed bearing which extends at least part of the way into the hub part of the blower rotor, and 3a is the connection for lubrication oil infeed. The numbers 4 denote the lubricating oil ducts in the fixed bearing part 3 which carry the oil to bearing points 13 and 14. Fixed bearing part 3 is secured to central housing part 5. 6 is the helicoidally twisted compressed air duct of the pressure medium for the blower. Radial ribs 7 are provided between housing part 5 and pressure duct 6. The lubricating oil flows from entrance 3a downwards to bearing points 13 and 14 of bearing shaft 8. The hub of the blower rotor can be mounted at one end of the bearing shaft, where the latter is designed as a body of rotation 8a, with key couplings 9. The coupling of the turbine rotor is executed principally with the aid of a threaded bolt 10 in the interior of the bearing shaft, as shown in Fig. 1. Special means are employed to prevent relative rotation and to ensure centering. The way in which the bearing point and the rotors are secured is not a subject of the present invention. When nut 10a is tightened supporting sleeve 11 presses axial bearing collar 12 against a shoulder of bearing shaft 8. The oil emerging from bearing points 13 and 14 is centrifuged towards annular space 15 between fixed bearing 3 and the wall of the blower hub and is conveyed upwards in axial direction, running over into overflow collector 16. From oil collecting duct 16 on, the annular gap 16 is designed to have a constantly decreasing diameter. Its bottom part is conical at 15a and next to this is given a disc bottom 15b. The wall of the blower hub extends up to the overflow point 16' into oil collector 16 for the upwardly centrifuged lubricating oil from the bearing points. Between the outer surface of the blower hub wall and the central part of the housing 5 in which the oil overflow collector is seated, is installed a labyrinth seal 17. In order to prevent the oil running over into collector 16 from getting into the labyrinth seal the latter is connected through a duct 17a with the air pressure duct 6 of the blower. For ventilation of the oil duct system one or more upwardly directed ducts 18 are installed in the fixed bearing part 3. From oil overflow collector 16 the oil flows off through ducts 19, which are inclined downwards, to the outside. According to the design represented in Fig. 1, these ducts comprise holes or recesses in ribs 7. Moreover, these ducts empty into an annular duct 20 provided in the housing of the blower, the latter duct clinging to the inside of the wall of helicoidally twisted pressure duct 6. From the annular duct 20 the oil flows approximately horizontally through ducts 21 to connection 21a of the oil drain pipe which is situated outside the engine. Duct or ducts 21 are situated in the bottom housing wall of medium pressure duct 6.

Figure 2:
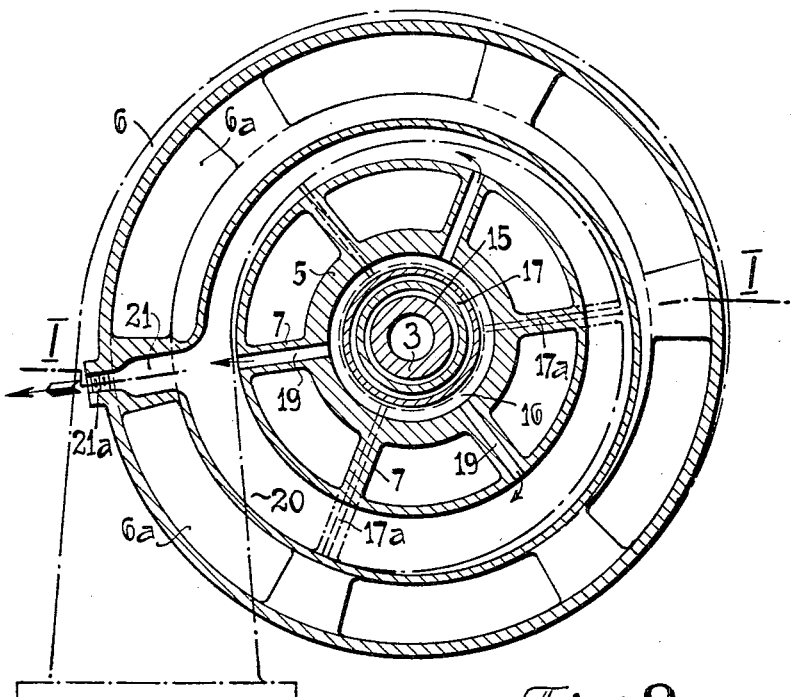
Fig. 2 shows a normal section along the line II—II of Fig. 1.

Fig. 2 gives a plan view of ribs 7 which connect pressure duct 6 to central housing part 5. 6a are the outlets for the peripheral pressure medium ducts in the helicoidal pressure duct 6. The annular duct 20 clinging to the inside of the pressure duct is represented in section; the oil outlet denoted by 21 is disposed between outlets 6a. Such ducts may also be provided between any other two outlets 6a. The way in which oil collecting duct 16 is bedded in the central part 5 of the housing is also represented. Annular gap 15, which is formed by the inner surface of the hub and the fixed bearing part and which contains the oil flowing upwards from the bearing point owing to the rotation, is placed at the top, is located about the inner wall of oil collecting duct 16. Radiating ducts or pipes 19, which are disposed in ribs 7 and are slanted in axial direction (as represented in Fig. 1), conduct the oil from collector 16 into annular space 20. Ducts 17a are provided in ribs 7a. These ducts 17a go all the way through below the oil collecting duct and open into the annular space for the labyrinth seal 17 to prevent admission of oil by means of an air block.

Figure 3:
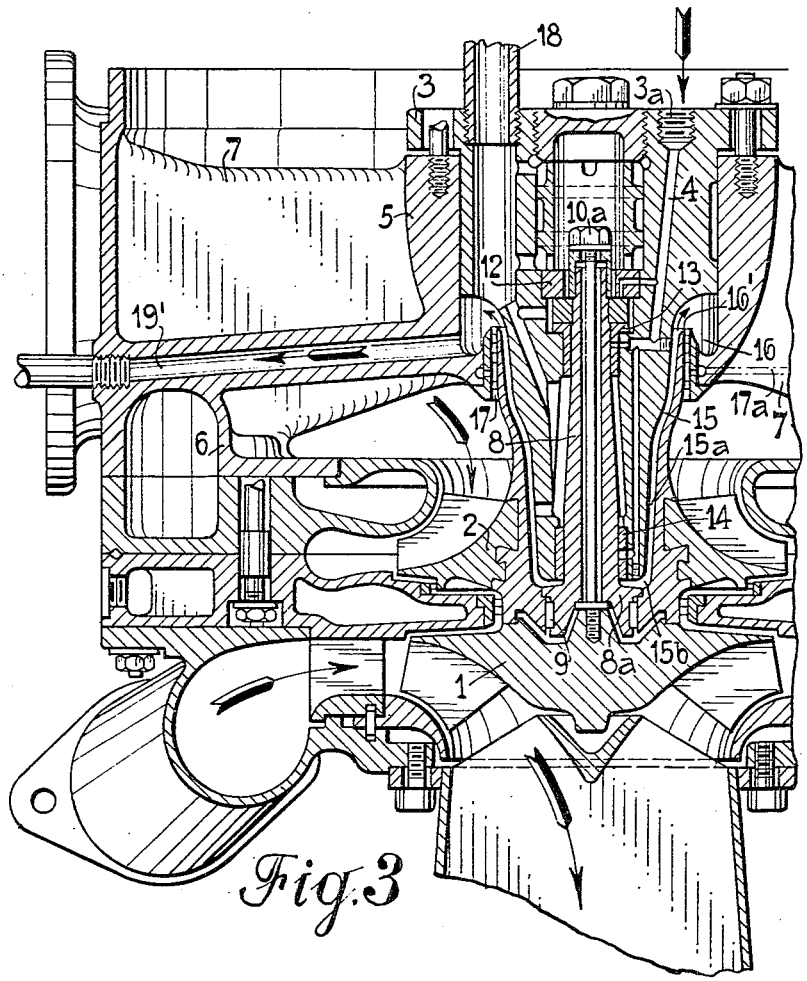
Fig. 3 shows a design in axial section with an arrangement of the bearing shaft as in Fig. 1, where the pipes leading away from the oil collecting duct above a sector of the blower go directly to the outside connections.

Fig. 3 shows a design which also relates to an arrangement of the bearing shaft from the bottom upwards. To differentiate from Fig. 1, the pipes 19' leading down from oil collecting duct 16 are placed above the pressure duct of the blower, and this only in a certain sector at the beginning of helicoidal duct 6, where the flow cross-section is comparatively small. The ventilation of the oil duct system and the air block feed to the labyrinth seal is executed in the same way as described and represented in connection with Fig. 1.

Figure 4:
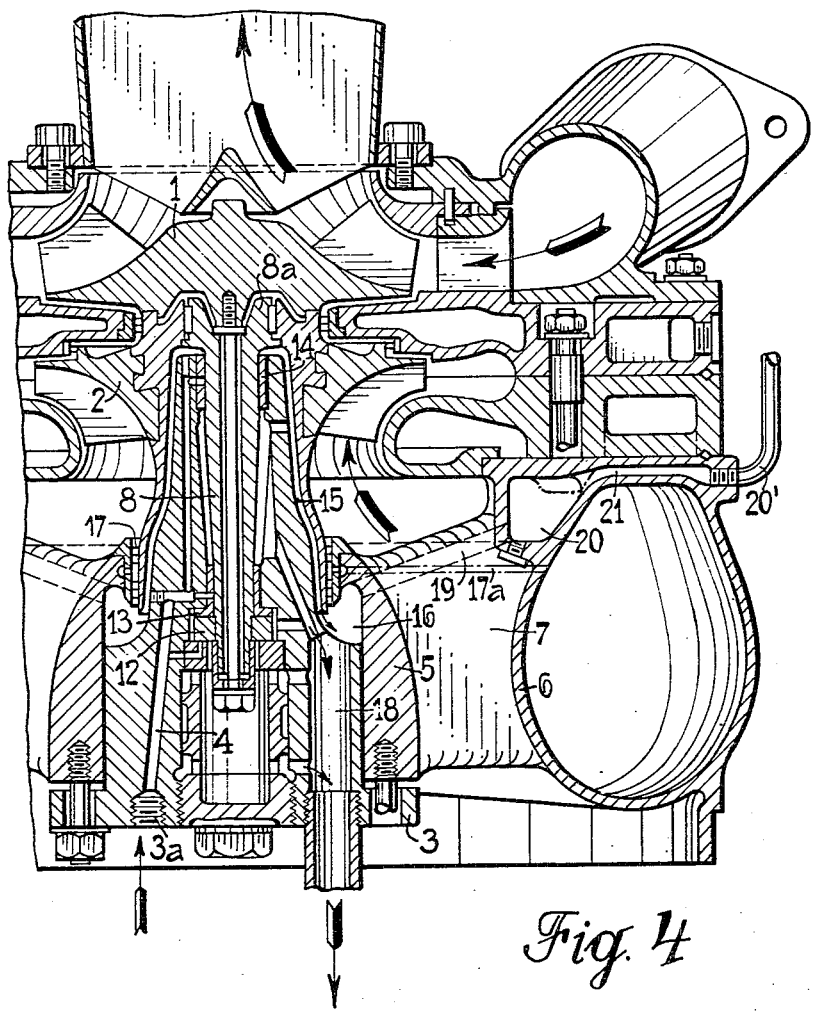
Fig. 4 shows an axial section through both rotors in an arrangement of the same structural parts represented in Fig. 1, with a bearing shaft going vertically from the top down, i. e. the turbine housing is above the blower housing.

Fig. 4 shows the same structural parts for an arrangement with a bearing shaft running from top to bottom, as that in Fig. 1 is for a bearing shaft running from bottom to top. Here only the use of the oil outlet ducts, which are executed as represented in Fig. 1, is changed. These ducts 19 and 21, and annular space 20 here constitute the ventilation system, to which one or more upwardly directed ventilation pipes 20' are connected outside the engine. Axially directed duct 18, which in an arrangement according to Fig. 1, serves for ventilation of the oil duct system, is used here as an oil outlet pipe.

Figure 5:
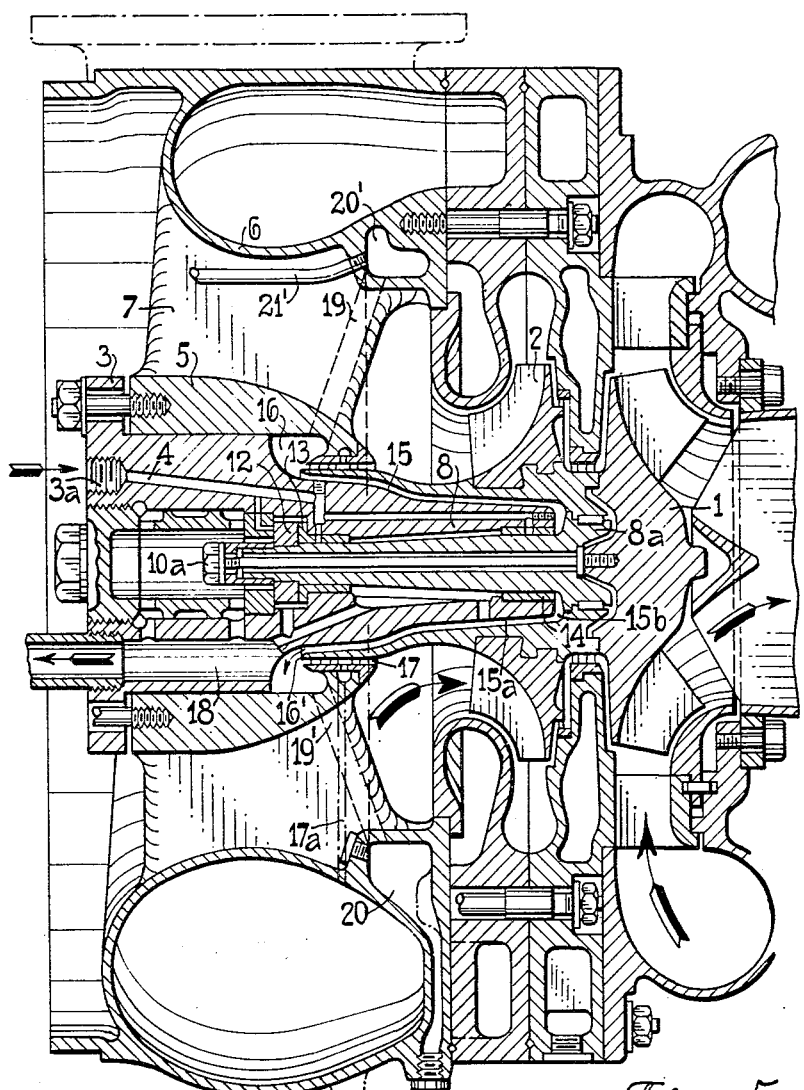
Fig. 5 shows an axial section again for a design and arrangement of the structural parts according to Fig. 1, but with a horizontally placed bearing shaft.

Fig. 5 shows a design with a horizontal bearing shaft. The structural parts are again the same as for a design with a bearing shaft running from bottom to top, as in Fig. 1. The axially directed duct 18 here serves as an oil run-off duct, as in Fig. 4. Of the ducts used in Fig. 4 for ventilation only the upwardly directed ducts can be considered here, i. e. ducts 19 with the upper semi-circular part of annular space 20'. The downwardly sloping ducts 19' together with the lower semi-circular half of annular space 20 constitute an oil reservoir in which the contaminated oil of greater specific weight collects and can be drained off through drain cocks for the purpose of purifying the oil system.

Figure 6:
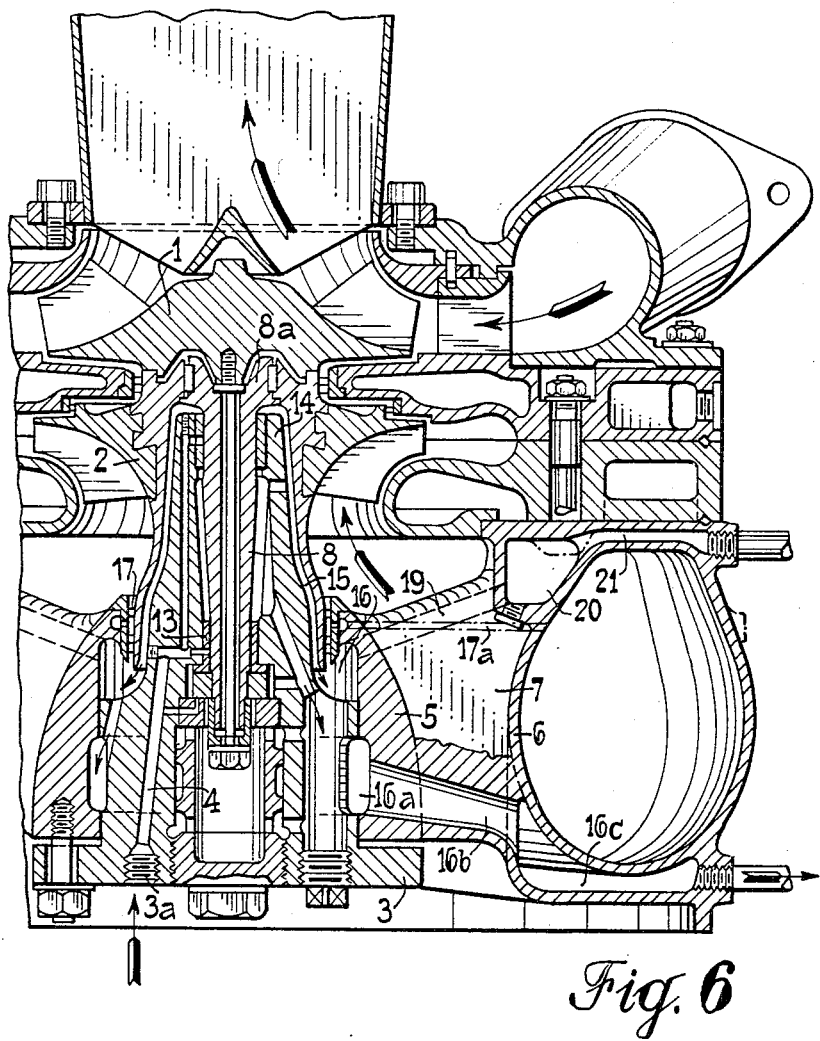
Fig. 6 shows a design, in axial section, with a central housing part which has an oil collecting duct displaced axially further towards the outside.

Fig. 6 shows a design with a second collecting duct 16a which is axially displaced towards the outside compared with the previously described oil collecting duct 16. Where the bearing shaft is directed downwards from above, with the turbine housing placed above the blower housing, as illustrated in this figure, the ducts 19 connected to collecting space 16 are used for ventilation of the oil system, as provided for in Fig. 4. The oil run-off ducts then start at the second, displaced collecting duct 16a. These ducts take the form of recesses 16b in the radiating ribs 7 and of recesses 16c connecting to them above the pressure duct of the blower on the side opposite ducts 21. With a bearing shaft directed upwards from below (Fig. 1), or a horizontal bearing shaft (Fig. 5), the displaced second collecting duct and ducts 16b and 16c connected to it are used for ventilation. Collecting duct 16 retains its function as an oil collecting duct, as described in connection with Fig. 1.

With the subject of the invention an assemblage of similarly designed structural parts is produced which can serve for all arrangements of the bearing shaft of the machine. In the case of a bearing shaft starting from the turbine at the bottom and going upwards, the invented measures in particular permit an especially advantageous design of the lubricating oil system and its input and output lines, including an especially simple and effective ventilation. It is also shown how the same advantages can be exploited for any other position of the bearing shaft, using the same structural parts, which can thereby be achieved, e. g. during a reconstruction or for a different construction of the engine.

We claim:

1. A turbine driven blower comprising a turbine rotor for a hot actuating medium and a blower rotor, a central housing, a common shaft for both said rotors, each of said rotors having a central hub portion for direct rigid assembly of the rotors to each other and to said common shaft, an overhung stationary bearing support extending axially into the hub portion of the blower rotor, said stationary bearing support being rigidly fastened to extend centrally from said housing, spaced bearings in said support, an annular extension on said blower rotor hub portion encircling said common shaft and said bearing support extending into said central housing, inlet duct means in said housing for supplying lubricating oil to said bearings, and distribution duct means leading to said spaced bearings in said support for cooling and lubrication of said bearings, a circular oil collecting means situated around the free end of the said blower rotor hub extension within said central housing and formed at least partly in said central part of the blower housing, discharge duct means leading from said bearings for the discharge of lubricating oil connected to said circular oil collecting space, said discharge duct means being directed axially and radially outwardly to discharge lubricating oil by centrifugal action into said circular oil collecting space, and outgoing duct means from said circular oil collecting space to the outside of the machine.

2. The device of claim 1, in which said circular oil collecting space lies in a substantially horizontal plane and said discharge duct means is inclined downwardly from said plane.

3. The device of claim 1, including an air flow passage around said central housing to said blower rotor, a plurality of duct means leading radially from said circular oil collecting space to an annular space surrounding said air flow passage from which lubricating oil is drained by a discharge opening extending radially outwardly therefrom.

4. The device of claim 1, in which at least one vent duct is connected from said circular oil collecting space to the outside of the machine.

5. The device of claim 4, wherein a second auxiliary circular oil collecting space is provided connected to said vent duct so that upon inversion of the device said vent duct may operate as an oil discharge passage and said circular oil collecting space and said discharge duct means may act as a vent.

6. The device of claim 1, in which the inner surface of said extension on said blower rotor hub and the outer surface of said stationary bearing support are so constructed and arranged as to leave an annular clearance therebetween, said clearance being generally conical from a minimum diameter within the hub of said blower rotor to a maximum diameter at said circular oil collecting space, to provide for the flow of oil by centrifugal force into said oil collecting space.

7. The device of claim 6, in which a labyrinth seal is provided against said extension on said blower hub between said circular oil collecting space and said blower rotor to prevent leakage of oil into said blower.

8. The device of claim 7, wherein a pressure space receiving pressure from said blower is provided, and a duct is provided from said pressure space to said labyrinth seal, to provide said seal with blocking air against leakage of oil past said sealing means.

9. The device of claim 6, in which said clearance space between the inner surface of the annular extension and the outer surface of said stationary support means is of such width that it is never entirely filled with oil discharged from said bearings.

References Cited in the file of this patent

UNITED STATES PATENTS

| | | |
|---|---|---|
| 2,165,448 | Browne | July 11, 1939 |
| 2,492,672 | Wood | Dec. 27, 1949 |
| 2,531,411 | Davenport | Nov. 28, 1950 |

FOREIGN PATENTS

| | | |
|---|---|---|
| 617,253 | Germany | Aug. 15, 1935 |